(12) United States Patent
Furukawa

(10) Patent No.: US 6,643,230 B2
(45) Date of Patent: Nov. 4, 2003

(54) OPTICAL INFORMATION REPRODUCING APPARATUS

(75) Inventor: Junichi Furukawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 413 days.

(21) Appl. No.: 09/801,061

(22) Filed: Mar. 8, 2001

(65) Prior Publication Data

US 2001/0053163 A1 Dec. 20, 2001

(30) Foreign Application Priority Data

Mar. 8, 2000 (JP) ........................................ 2000-063082

(51) Int. Cl.[7] ................................................ G11B 7/00
(52) U.S. Cl. ............................... 369/44.23; 369/44.32; 369/44.35; 369/53.28; 369/112.02
(58) Field of Search ........................... 369/44.23, 44.29, 369/44.32, 44.33, 44.35, 44.36, 47.25, 53.12, 53.13, 53.28, 112.02

(56) References Cited

U.S. PATENT DOCUMENTS 6,034,939 A * 3/2000 Takasawa et al. ....... 369/112.17
6,545,958 B1 * 4/2003 Hirai et al. .............. 369/44.32

* cited by examiner

Primary Examiner—Paul W. Huber
(74) Attorney, Agent, or Firm—Sughrue Mion, PLLC

(57) ABSTRACT

An optical information reproducing device enables enhancement of information reading accuracy by correcting spherical aberration even if the spherical aberration occurs due to a thickness error in the transparent substrate of an optical disk. The correction amount of the spherical aberration is always changed such that the tracking servo gain in the tracking servo becomes maximum.

6 Claims, 4 Drawing Sheets

OPTICAL INFORMATION REPRODUCING APPARATUS

BACKGROUND OF THE INVENTION

1. Field of the Invention

The present invention relates to an optical information reproducing apparatus which reproduces recorded information from an optical recording medium.

2. Description of the Related Art

An optical disk used as an optical recording medium includes a transparent substrate of a predetermined thickness for covering and protecting the recording surface of the disk. An optical pickup irradiates a reading light beam on the recording surface through the transparent substrate. The optical pickup reads recorded information from the optical disk based on a reflected light from the recording surface.

However, it is difficult to form the thicknesses of the transparent substrates of all optical disks to be of a predetermined value during manufacture of the disks, and typically, a thickness error of several tens μm arise. As a result, spherical aberration is generated by the thickness error in the transparent substrate. When the spherical aberration is generated, the amplitude level of a tracking error signal can be significantly reduced, leading to the problem that the information reading accuracy is reduced.

OBJECTS AND SUMMARY OF THE INVENTION

Accordingly, it is an object of the present invention to provide an optical information reproducing apparatus capable of conducting accurate reading of information even if spherical aberration is generated by the thickness error in the transparent substrate of an optical disk.

An optical information reproducing apparatus according to the present invention which reproduces recorded information from an optical recording medium, comprises an optical system including a laser generating device for generating a laser light beam, an objective lens for condensing said laser light beam onto a recording track formed on the optical recording medium and a photo detector for photoelectric converting reflected light from the optical record medium into a photoelectric converting signal; a tracking servo circuit for controlling the laser light beam condensed with the objective lens so as to trace the recording track; a spherical aberration correcting part for correcting a spherical aberration of the optical system in accordance with a correction amount; a tracking servo gain measuring circuit for measuring a tracking servo gain in the tracking servo circuit; and aspherical aberration correcting controller changing the correction amount so as to the tracking servo gain becomes maximum.

DETAILED DESCRIPTION OF THE PREFERRED EMBODIMENTS

Embodiments of the present invention will be described below with reference to the drawings.

Figure 1:
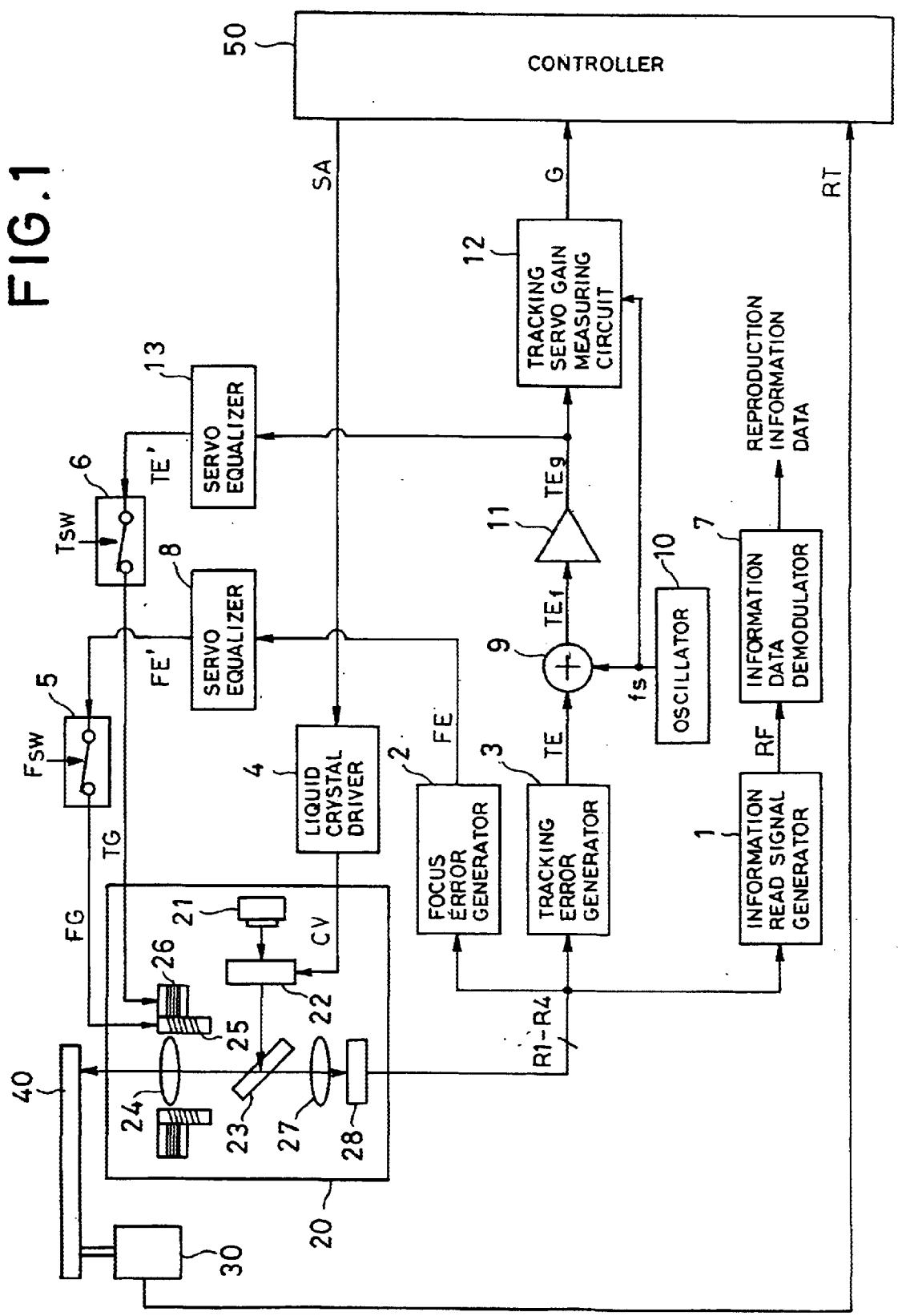
FIG. 1 is a diagram showing an optical system of an optical information reproducing apparatus according to the present invention.

FIG. 1 is a diagram showing an optical information reproducing apparatus according to the present invention.

In FIG. 1, a pickup 20 irradiates a reading light beam on an optical disk 40. The disk 40 is rotationally driven by a spindle motor 30 and receives the reflected light. The spindle motor 30 generates a rotational signal RT every time the spindle motor 30 rotates the optical disk 40 one turn, and supplies the rotational signal RT to a controller 50. The pickup 20 receives the reflected light and converts the light into electric signals, and then the obtained photoelectric converted signals are supplied to an information reading signal generator 1, a focus error generator 2 and a tracking error generator 3, respectively. The pickup 20 includes a laser generating device 21, a liquid crystal panel 22, a half mirror 23, an objective lens 24, a focussing actuator 25, a tracking actuator 26, a condenser lens 27 and a photo detector 28.

The laser generating device 21 generates laser light beams with a predetermined optical power. Such laser light beams pass through the liquid crystal panel 22 and are introduced to the half mirror 23. The liquid crystal panel 22 are provided to correct the spherical aberration due to a thickness error in the transparent substrate of the optical disk 40.

Figure 2:
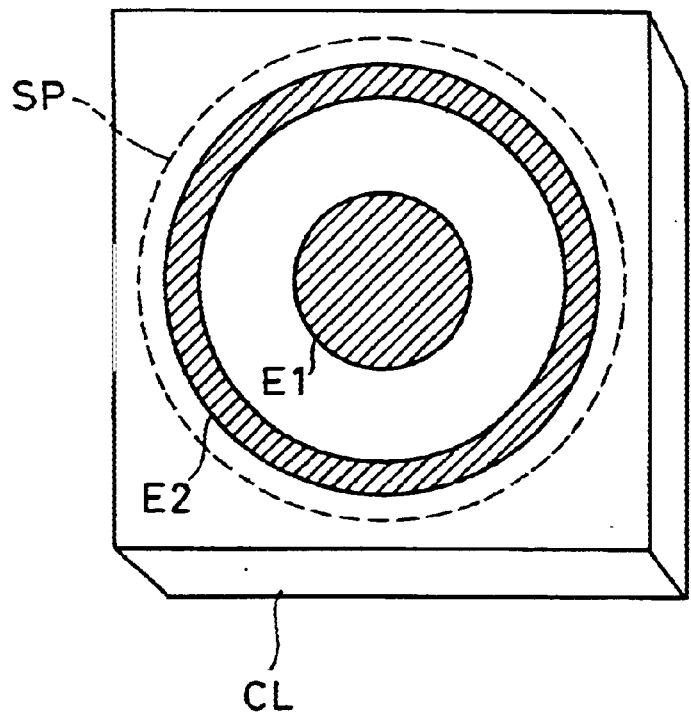
FIG. 2 is a perspective view showing a schematic structure of a liquid crystal panel 22.

FIG. 2 is a perspective view showing the structure of the liquid crystal panel 22 viewed from the direction of the optical axis of a laser light beam.

As shown in FIG. 2, the liquid crystal panel 22 comprises a circular transparent electrode E1, an annular transparent electrode E2 and a liquid crystal layer CL filled with liquid crystal molecules having birefringence properties. In a case where the lens diameter of the objective lens 24 is 3000 μm, the diameter of the transparent electrode E1 is, for example, about 1600 μm and the outer diameter of the transparent electrode E2 is about 2800 μm. It is noted that both the central axes of the transparent electrodes E1 and E2 coincide with the center of the optical axis of the laser light beam. A predetermined potential (for example, 2 volts) is fixedly applied to the transparent electrode E1, while a liquid crystal drive potential CV from the liquid crystal driver 4 is applied to the transparent electrode E2. At this time, the twist angle of the liquid crystal molecules in the region covered with the transparent electrode E2 in the liquid crystal layer CL is shifted by an angle according to liquid crystal drive potential CV. Thus, when the beam spot SP based on a laser light beam is irradiated on the liquid crystal panel 22, as shown in FIG. 2, a phase difference according to the above-mentioned liquid crystal drive potential CV is produced between the light which passes through the region covered with the transparent electrode E2 and the light which passes through other regions. That is, light from the liquid crystal panel 22 is output with such phase difference as mentioned above while passing over the wave surface of the laser light beam supplied from the laser generating device 21. By such an operation the liquid crystal panel 22 corrects spherical aberration due to variations in thickness of the transparent substrate of the optical disk.

The half mirror 23 conducts the laser light beam supplied from the liquid crystal panel 22 to the objective lens 24. The objective lens 24 condenses the laser light beam supplied from the half mirror 23 onto the recording track formed on the recording surface of the optical disk 40 as the reading light beam. The focussing actuator 25 moves the objective lens 24 perpendicularly to the recording surface of the optical disk 40, i.e., on a focus adjusting track in response to a focus drive signal FG supplied from a servo loop switch 5. The tracking actuator 26 shifts the optical axis of the objective lens 24 by a distance according to the tracking drive signal TG supplied from the servo loop switch 6 in the direction perpendicular to the recording track formed on the optical disk 40.

The reflected light obtained when the reading light beam is irradiated on the recording track of the optical disk 40, is conducted to the condenser lens 27 through the objective lens 24 and the half mirror 23. The condenser lens 27 condenses such reflected light and irradiates the light receiving surface of the photo detector 28 with the light.

Figure 3:
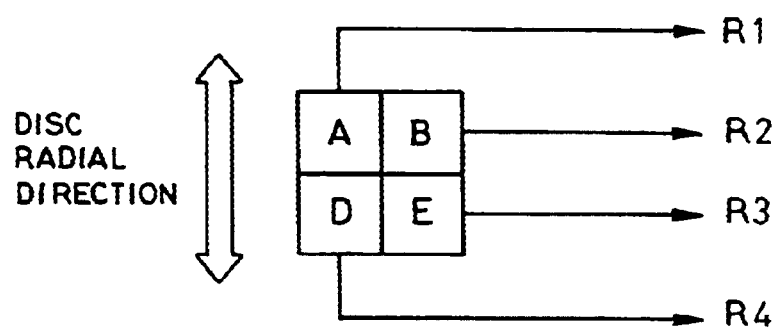
FIG. 3 is a diagram showing a light receiving surface of a photo detector 28.

FIG. 3 is a diagram showing a light receiving surface of the photo detector 28.

As shown in FIG. 3, the photo detector 28 includes four separate light receiving devices A to D arranged in a manner shown in the FIG. 3 in the recording track direction. Each of the light receiving devices A to D receives the reflected light supplied from the condenser lens 27 and outputs the light converted to electric signals as photoelectric conversion signals R1 to R4.

The information reading signal generator 1 obtains addition results obtained by adding the above-mentioned photoelectric conversion signals R1 to R4 to each other as information reading signals corresponding to the information data recorded in the optical disk 40, and then supplies the signals to an information data demodulator 7. The information data demodulator 7 reproduces the information data by executing predetermined demodulation processing for such information reading signals and outputs the data as reproduced information data.

The focus error generator 2 obtains the sums of the outputs of the light receiving devices A to D diagonally positioned to each other in the receiving devices A to D in the photo detector 28, and supplies the differential values therebetween to a servo equalizer 8 as a focus error signal FE. That is, the focus error generator 2 supplies the focus error signal FE that is, $$FE=(R1+R3)-(R2+R4),$$

to the servo equalizer 8.

The servo equalizer 8 supplies a compensation focus error signal FE' obtained by phase compensation processing for the focus servo with respect to the focus error signal FE, to the servo loop switch 5. The servo loop switch 5 maintains one of an on state and off state according to the focus servo switch signal $F_{sw}$ supplied from a reproducing controller (not shown). For example, when the focus servo switch signal $F_{sw}$ for the logic level "0", which shows the focus servo is off, is supplied, the servo loop switch 5 is in the off state. On the other hand, when the focus servo switch signal $F_{sw}$ for a logic level "1", which shows that the focus servo is on, is supplied, the servo loop switch 5 is in the on state, and commences supply of the focus drive signal FG according to the above-mentioned compensation focus error signal FE' to the focussing actuator 25.

The tracking error generator 3 seeks the output difference between the light receiving devices both placed in tracking directions in the light receiving devices A to D of the photo detectors 28, that is, the difference between (R1+R2) and (R3+R4), and this difference is produced as the tracking error signal TE. An oscillator 10 generates an oscillation signal of, for example, 1 kHz having a predetermined amplitude and frequency as a disturbance signal, and this oscillation signal is supplied to an adder 9 as the disturbance signal fs. The adder 9 supplies the addition result obtained by the addition of the disturbance signal fs to the tracking error signal TE to a servo amplifier 11 as the disturbance superimposed tracking error signal $TE_f$. The servo amplifier 11 supplies the disturbance superimposed tracking error signal $TE_g$ obtained by amplifying the disturbance superimposed tracking error signal $TE_f$ to a desired level to a tracking servo gain measuring circuit 12 and a servo equalizer 13, respectively.

The tracking servo gain measuring circuit 12 first extracts only the band component of the disturbance signal fs from the disturbance superimposed tracking error signal $TE_g$, and this component is obtained as a servo residual error value. Then, the tracking servo gain measuring circuit 12 determines the ratio of such a servo residual error value to the amplitude width value of the disturbance signal fs itself and sets this ratio as a tracking servo gain value. The tracking servo gain measuring circuit 12 supplies the tracking servo gain signal G showing the tracking servo gain value to the controller 50. The servo equalizer 13 supplies a compensated tracking error signal TE' obtained by phase compensation processing for the tracking servo with respect to the disturbance superimposed tracking error signal $TE_g$, to the servo loop switch 6. The servo loop switch 6 maintains one of the on state and the off state according to the tracking servo switch signal T, supplied from a reproducing controller (not shown). For example, when the tracking servo switch signal $T_{sw}$, for a logic level "1", is supplied, which shows that the tracking servo is on, the servo loop switch 6 is in the on state, and commences supply of the tracking drive signal TG according to the above-mentioned compensated tracking error signal TE' to the tracking actuator 26. On the other hand, when the tracking servo switch signal $T_{sw}$ for the logic level "0", is supplied, which shows that the focus servo is off, the servo loop switch 6 is in the off state. At this point, supply of the tracking drive signal TG is not executed to the tracking actuator 26.

That is, there is formed a tracking servo loop comprising the pickup 20, tracking error generator 3, adder 9, servo amplifier 11, servo equalizer 13 and the servo loop switch 6. When the servo loop switch 6 is in the on state, the tracking servo loop assumes the closed state and the drive control of the actuator 26 is performed such that laser light beams condensed with the objective lens 24 traces the recording track.

Figure 4:
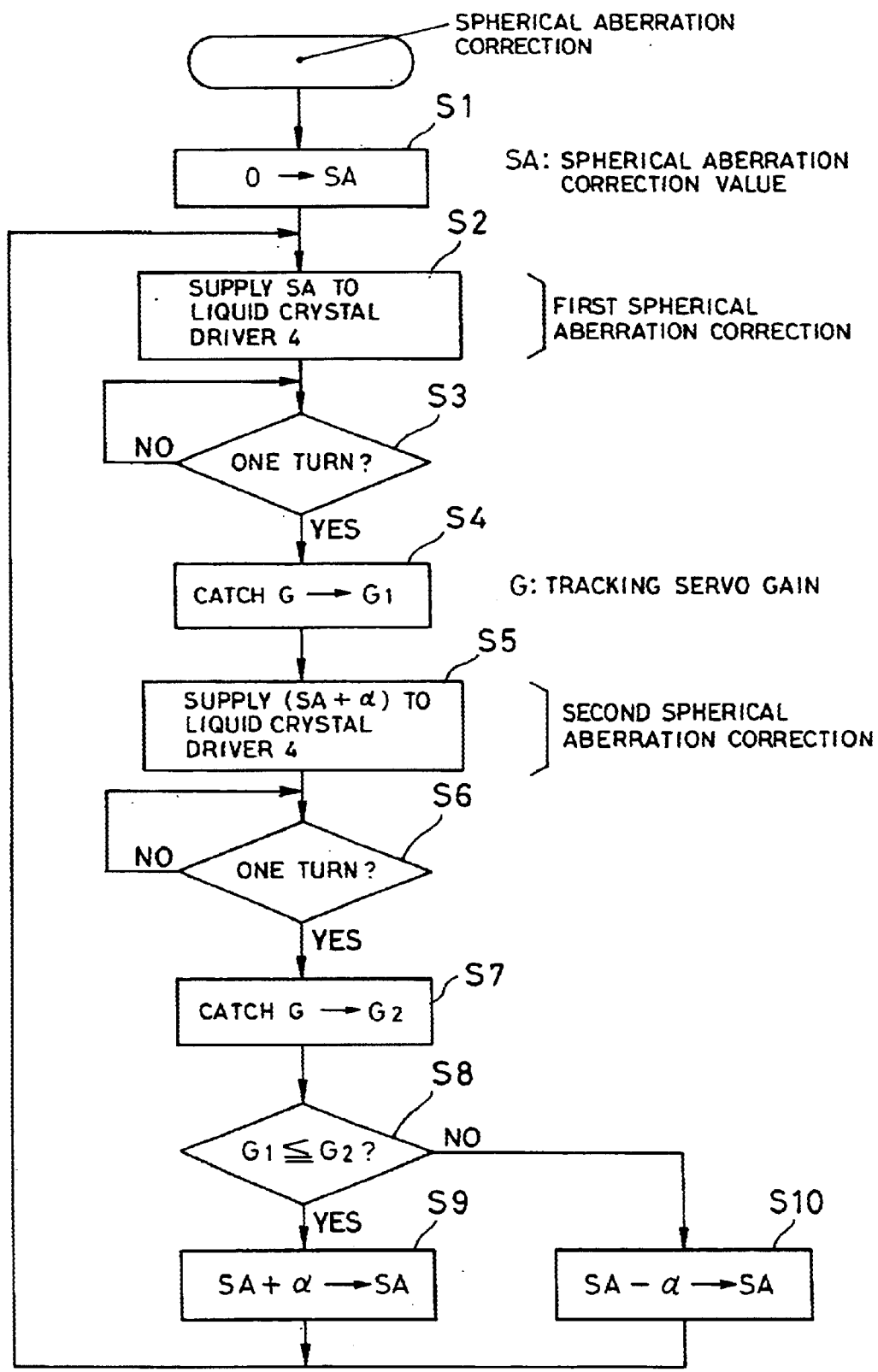
FIG. 4 is a view showing a spherical aberration correction control flow.

The controller 50 performs correction control of the spherical aberration by the steps shown in FIG. 4 during the reproduction operation of the optical information reproducing apparatus shown in FIG. 1.

In FIG. 4, the controller 50 first stores "0" as the initial value of a spherical aberration correction value SA in an internal resistor (not shown) (step S1). Next, the controller 50 supplies the spherical aberration correction value SA stored in the internal resistor to the liquid crystal driver 4 (step S2). By the execution of such step S2, the liquid crystal driver 4 generates the liquid crystal drive potential CV having an electric potential according to the spherical aberration correction value SA and applies the electric potential to the liquid crystal panel 22. Therefore, at this point, when a laser light beam is irradiated on the liquid crystal panel 22, a phase difference according to the spherical aberration correction value SA is generated between the light which passes through the region covered with the annular transparent electrode E2 shown in FIG. 2 and the light which passes through other regions. As a result, the first spherical aberration correction is carried out. Then, the controller 50 repeats determinations on whether or not the optical disk 40 has made one turn based on the rotational signal RT supplied from the spindle motor (step S3). In such step S3 if it was determined that the disk 40 has made one turn, the controller 50 receives the tracking servo gain signal G supplied from the tracking servo gain measuring circuit 12 to store this signal G into the internal resistor as the first servo gain $G_1$ (step S4). That is, the tracking servo gain obtained in the first spherical aberration correction state is stored into the internal resistor as the first servo gain $G_1$.

Next, the controller 50 supplies the addition of a predetermined value a to a spherical aberration correction value SA stored in the internal resistor, to the liquid crystal driver 4 (step S5). By the execution of such step S5, the liquid crystal driver 4 generates a liquid crystal drive potential CV having the electric potential according to the above-mentioned (SA+α). The liquid crystal driver 4 applies the liquid crystal drive potential CV to the liquid crystal panel 22. Therefore, at this point, when the laser light beam is irradiated on the liquid crystal panel 22, a phase difference according to (SA+α) occurs between the light which passes through a region covered with the annular transparent electrode E2 and the light which passes through the other region as shown in FIG. 2. As a result, the second spherical aberration correction is carried out. Then, the controller 50 repeats the determination of whether or not the optical disk 40 has made one turn based on the rotational signal RT supplied from the spindle motor 30 (step S6). In such step S6 if it was determined that this optical disk 40 has made one turn, the controller 50 receives the tracking servo gain signal G supplied from the tracking servo gain measuring circuit 12 and stores the tracking servo gain signal G in the internal resistor as the second servo gain signal $G_2$ (step S7). That is, the tracking servo gain which was obtained in a spherical aberration correction state due to the second spherical aberration correction is stored in the internal resistor as the second servo gain signal $G_2$.

Next, the controller 50 determines whether or not the second servo gain $G_2$ is a value which is equal to or greater than the first servo gain $G_1$ (step S8).

In such step S8, when it was determined that the second servo gain $G_2$ was a value which was equal to or greater than the first servo gain $G_1$, the controller 50 adds the predetermined value α to the spherical aberration correction value SA stored in the internal resistor. The controller 50 overwrites the resultant value as a new spherical aberration correction value SA, in the internal resistor (step S9).

On the other hand, in the above-mentioned step S8, when it was determined that the second servo gain $G_2$ was a value which was smaller than the first servo gain $G_1$, the controller 50 subtracts the predetermined value a from the spherical aberration correction value SA stored in the internal resistor. The controller 50 overwrites the resultant value as a new spherical aberration correction value SA, in the internal resistor (step S10).

After the execution of step S10 or step S9, the controller 50 returns the execution of the above-mentioned step S2 and repeatedly executes the above-mentioned steps.

According to the operations, the values of the spherical aberration correction value SA are always shifted in a direction so that the tracking servo gain becomes larger (increase or decrease).

Figure 5A:
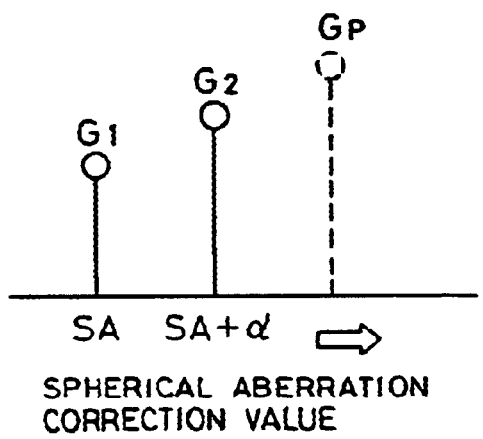
FIGS. 5A and 5B are views showing the shifts of the spherical aberration corrected values SA.
Figure 5B:
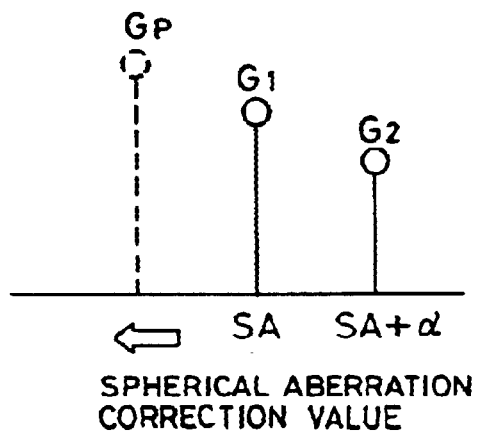

FIGS. 5A and 5B show the shifts of the spherical aberration correction values SA performed by the spherical aberration correction control.

Specifically, FIG. 5A is a view showing the case where the first servo gain $G_1$ is smaller than the second servo gain $G_2$ obtained when the spherical aberration correction was executed with the correction value of the spherical aberration correction value SA+α. In contrast, FIG. 5B is a view showing the case where the first servo gain $G_1$ is larger than the second servo gain $G_2$.

First, as shown in FIG. 5A, when the second servo gain $G_2$ is larger than the first servo gain $G_1$, the increment of the spherical aberration correction value is proportional to the increment of the tracking servo gain. That is, according to the determination at this point, if an amount of spherical aberration correction is increased, it is expected to obtain a larger tracking servo gain $G_P$ as shown by the broken line in FIG. 5A. Thus, at this time, by the execution of step S9, a value obtained by adding the predetermined value a to the spherical aberration correction value SA at the present point is set to a new spherical aberration correction value SA. Thus, the values of the spherical aberration correction value SA are shifted in the increasing direction shown by the arrow in FIG. 5A.

On the other hand, as shown in FIG. 5B, when the second servo gain $G_2$ is smaller than the first servo gain $G_1$, the increment of the spherical aberration correction value is inversely proportional to the increment of the tracking servo gain. That is, according to the determination at this point, if an amount of spherical aberration correction is decreased, it is expected to obtain a larger tracking servo gain $G_p$ as shown by the broken line in FIG. 5B. Thus, at this time, by the execution of step S10, a value obtained by subtracting the predetermined value α from the spherical aberration correction value SA at the present point is set to a new spherical aberration correction value SA. Thus, the values of the spherical aberration correction value SA are shifted in the decreasing direction shown by the arrow in FIG. 5B.

That is, in the present invention, attention is paid to the facts that when spherical aberration occurs in the optical system, the tracking servo gain is decreased in accordance with the degree of the spherical aberration, and the values of the spherical aberration correction value SA are always shifted in the direction increasing (increase or decrease) tracking servo gain. According to such operations, even in the operation of reduction of the optical information reproducing apparatus, the optical spherical aberration correction is always executed by an optimal spherical aberration correction value.

It is noted in the above-mentioned embodiment of the present invention that when the value of the spherical aberration correction value SA which is required for driving the liquid crystal panel 22 is renewed, it is changed by every predetermined value α in the direction increasing the tracking servo gain. However, the present invention is not limited to this. For example, the next spherical aberration correction value SA may be obtained based on the servo residual error value obtained by extraction of the band component of the disturbance signal fs from the above-mentioned disturbance superimposed tracking error signal $TE_g$ and the present spherical aberration correction value SA.

As described above, according to the optical information reproducing apparatus of the present invention, even if spherical aberration occurs due to the thickness error in the transparent substrate of the optical disk, spherical aberration correction using the optimal correction value is always executed during the reproduction operation. As a result, the information read accuracy is enhanced.

What is claimed is:

1. An optical information reproducing apparatus for reproducing recorded information from an optical recording medium, comprising:

an optical system including a laser generating device for generating a laser light beam, an objective lens for condensing said laser light beam onto a recording track formed on said optical recording medium and a photo detector for photoelectrically converting reflected light from said optical record medium into a photoelectric converting signal;

a tracking servo circuit for controlling said laser light beam condensed with said objective lens so as to trace said recording track;

a spherical aberration correcting part for correcting a spherical aberration of said optical system in accordance with a correction amount;

a tracking servo gain measuring circuit for measuring a tracking servo gain in said tracking servo circuit; and a spherical aberration correcting controller changing said correction amount as to said tracking servo gain becomes maximum.

2. The optical information reproducing apparatus according to claim 1, wherein said spherical aberration correcting part comprises a liquid crystal panel in which an annular transparent electrode is formed on a liquid crystal layer having birefringence properties, and a liquid crystal drive circuit for applying a electric potential according to said correction amount to said transparent electrode.

3. The optical information reproducing apparatus according to claim 2, wherein said liquid crystal panel is provided between said laser generating device and said objective lens in said optical system.

4. The optical information reproducing apparatus according to claim 1, wherein said tracking servo circuit comprises:

a tracking error generator for generating a tracking error signal based on said photoelectric converting signal;

an oscillator for generating a disturbance signal having a predetermined amplitude value and frequency;

an adder for obtaining a disturbance superimposed tracking error signal by the addition of said tracking error signal and said disturbance signal;

a servo equalizer for compensating phase properties of said disturbance superimposed tracking error signal to produce a compensated tracking error signal; and a tracking actuator for shifting the optical axis of said objective lens in a direction perpendicular to said recording track by a distance in accordance with said compensated tracking error signal.

5. An optical information reproducing apparatus for reproducing recorded information from an optical recording medium, comprising:

an optical system including a laser generating device for generating a laser light beam, an objective lens for condensing said laser light beam onto a recording track formed on said optical recording medium and a photo detector for photoelectrically converting reflected light from said optical record medium into a photoelectric converting signal;

a tracking error generator for generating a tracking error signal based on said photoelectric converting signal;

an oscillator for generating a disturbance signal having a predetermined amplitude value and frequency;

an adder for obtaining a disturbance superimposed tracking error signal by the addition of said tracking error signal and said disturbance signal;

a servo equalizer for compensating phase properties of said disturbance superimposed tracking error signal to produce a compensated tracking error signal;

a tracking actuator for shifting the optical axis of said objective lens in a direction perpendicular to said recording track by a distance in accordance with said compensated tracking error signal;

a spherical aberration correcting part for correcting a spherical aberration of said optical system in accordance with a correction amount;

a tracking servo gain measuring circuit for measuring a tracking servo gain; and a spherical aberration correcting controller changing said correction amount as to said tracking servo gain becomes maximum.

6. The optical information reproducing apparatus according to claim 5, wherein said tracking servo gain measuring circuit extracts the same frequency component as that of said disturbance signal from said disturbance superimposed tracking error signal to obtain the component as a servo residual error value, and said tracking servo gain is obtained based on the ratio of said servo residual error value to the amplitude width of said disturbance signal.

* * * * *